United States Patent
Tanaka et al.

(10) Patent No.: US 10,006,834 B2
(45) Date of Patent: Jun. 26, 2018

(54) VEHICLE TESTING SYSTEM

(71) Applicant: HORIBA, Ltd., Kyoto (JP)

(72) Inventors: Kei Tanaka, Kyoto (JP); Kazuhiro Shiomi, Kyoto (JP); Yoshifumi Sugihara, Kyoto (JP); Yoku Hirose, Kyoto (JP); Kazuki Furukawa, Kyoto (JP)

(73) Assignee: Horiba, Ltd., Kyoto (JP)

( * ) Notice: Subject to any disclaimer, the term of this patent is extended or adjusted under 35 U.S.C. 154(b) by 0 days. days.

(21) Appl. No.: 14/716,637

(22) Filed: May 19, 2015

(65) Prior Publication Data

US 2015/0338313 A1    Nov. 26, 2015

(30) Foreign Application Priority Data

May 20, 2014    (JP) .................................. 2014-104756

(51) Int. Cl.
   *G01M 17/007*    (2006.01)
   *G01M 13/02*    (2006.01)
   *G01M 15/02*    (2006.01)

(52) U.S. Cl.
   CPC ...... *G01M 17/007* (2013.01); *G01M 17/0072* (2013.01); *G01M 13/02* (2013.01); *G01M 15/02* (2013.01)

(58) Field of Classification Search
   CPC ........... G01M 17/007; G01M 17/0072; G01M 15/02; G01M 13/02
   See application file for complete search history.

(56) References Cited

U.S. PATENT DOCUMENTS

2007/0260373 A1*    11/2007    Langer ................ G01M 17/007
                                                                     701/31.4

FOREIGN PATENT DOCUMENTS

| JP | 2011-149921 | 8/2011 |
| JP | 2013-134151 | 7/2013 |

OTHER PUBLICATIONS

Kokujikan, "Test Procedure for Fuel Consumption Rate and Exhaust Emissions of Heavy Duty Hybrid Electric Vehicles Using Hardware-In-The-Loop Simulator System"; No. 281 Mar. 16, 2007. (see PDF supplied by Applicant).*
Kammerer et al., "The Chassis Dynamometer as a Development Platform"; Special AVL, Automobiltechnische 111 (2009) vol. 11; Springer Automotive Media. (see PDF supplied by Applicant).*
EESR dated Oct. 14, 2015, issued for European Patent Application No. 15 168 167.3, 12 pgs.

(Continued)

*Primary Examiner* — Mussa A Shaawat
*Assistant Examiner* — Michael V Kerrigan
(74) *Attorney, Agent, or Firm* — Brooks Kushman P.C.

(57)    ABSTRACT

A vehicle testing system includes: an actuator for operating a vehicle or a part of a vehicle in a predetermined algorithm; an operating conditions calculating unit that calculates operating conditions being applied to a component of the vehicle or a component of the part of the vehicle during the operation of the vehicle or the part of the vehicle by the actuator; and a component testing device that connects to the component, in which the component testing device operates and applies to the component the operating conditions calculated by the operating conditions calculating unit.

8 Claims, 3 Drawing Sheets

(56) References Cited

OTHER PUBLICATIONS

Test Procedure for Fuel Consumption Rate and Exhaust Emissions of Heavy-Duty Hybrid Electric Vehicles Using Hardware-In-The-Loop Simulator System, Kokujikan No. 281 of Mar. 16, 2007, 122 pgs.

Charles Kammerer et al., A Common Testing Platform for Engine and Vehicle Testbeds, Automobiltechnische Zeitschrift 111 (2009), Dec. 31, 2009, vol. 11, pp. 2-11.

Hosam K. Fathy et al., Review of Hardware-In-The-Loop Simulation and its Prospects in the Automotive Area, Proceedings of SPIE, May 22, 2006, vol. 6228, pp. 1-20.

* cited by examiner

VEHICLE TESTING SYSTEM

CROSS-REFERENCE TO RELATED APPLICATION

This application claims priority to JP Application No. 2014-104756, filed May 20, 2014, the disclosure of which is incorporated in its entirety by reference herein.

TECHNICAL FIELD

The present invention relates to a vehicle testing system for testing a vehicle such as an automobile or a part of the vehicle.

BACKGROUND ART

For instance, a chassis dynamometer for testing a complete vehicle as Japanese Unexamined Patent Application Publication No. 2011-149921 describes and an engine dynamometer for inspecting only an engine as Japanese Unexamined Patent Application Publication No. 2013-134151 describes are known as conventional test benches of vehicles.

In the chassis dynamometer, the complete vehicle driven by an automatic driving robot (automatic actuator) is placed on rollers, and a mechanical running test is conducted in a predetermined running pattern that simulates actual running. The chassis dynamometer measures the running performance of the vehicle as well as mileage, exhaust gas components, and more. Furthermore, an exhaust gas measuring apparatus or other apparatuses provided in a test bench can be operated in agreement with the chassis dynamometer.

Meanwhile, the engine dynamometer tests only an engine on which a simulated load is placed. In addition to measuring the output performance of the engine, the engine dynamometer measures mileage, exhaust gas components, and more.

In the development and production of vehicles, an engine dynamometer testing device tests an engine, and a chassis dynamometer testing device tests a complete vehicle. Ideally, the results of these two types of tests should be identical, though they frequently differ due to the influence of various factors such as an unexpected overload on the engine. Consequently, following the testing, adjustments are made to the engine, and further repeated testing may be required.

The process of development described above, which involves repeated testing and adjustments, can hinder the speedy development of the engine and its synchronized operation with various other parts and components of the vehicle, such as a transmission and a power train.

SUMMARY OF INVENTION

Technical Problem

In view of the above, a major objective of the present invention is to be able to test a complete vehicle and its components, or a part of the vehicle and its components, under conditions that are as similar as possible. Achieving this objective should reduce the need for repeated testing, and will result in speedier development and correction of malfunctions of vehicles or their parts.

Solution to Problem

That is, a vehicle testing system according to the present invention includes: an actuator control unit that controls an actuator for operating a vehicle or a part of a vehicle in a predetermined driving algorithm; an operating conditions calculating unit that calculates operating conditions being applied to a component of the vehicle or a component of the part of the vehicle during the operation of the vehicle or the part of the vehicle by the actuator; a component testing device that connects to the component; and a component testing device control unit that allows the component testing device to operate and apply to the component the operating conditions calculated by the operating conditions calculating unit.

Moreover, the present invention may be a method of testing a vehicle, including: controlling an actuator for operating the vehicle or a part of the vehicle in a predetermined driving algorithm, and calculating operating conditions being applied to a component of the vehicle or a component of the part of the vehicle during the operation of the vehicle or the part of the vehicle by the actuator; and controlling a component testing device that connects to the component for testing the component, and applying the calculated operating conditions.

This kind of vehicle testing system allows the component testing device to operate and reproduce the operating conditions calculated by the operating conditions calculating unit and test a component of a complete vehicle or a component of a part of a complete vehicle under similar operating conditions to operating conditions under which the complete vehicle or the part of the complete vehicle has been actually tested. Therefore, if the result of the component test confirms a predetermined performance, it is possible to minimize unexpected deficiencies in the component in testing the complete vehicle or the part of the vehicle including the component.

The above actuator control unit controls a physically existing actuator or controls an actuator reproduced in simulation. Alternatively, the actuator control unit directly inputs to an ECU or others a vehicle control command relating to an accelerator position or others without the actuator simulator.

More preferably, the vehicle testing system may include: an actuator model, storing information on operation features of the actuator; a component model, storing information on operation features of the component that are identified based on the operating conditions calculated by the operating conditions calculating unit; an actuator simulator that receives a command signal outputted by the actuator control unit, applies the command signal to the actuator model, and outputs a simulated operation signal corresponding to the operation of the actuator; and a vehicle simulator that receives the simulated operation signal outputted by the actuator simulator, applies the simulated operation signal to the component model, and outputs a simulated operating condition to be applied to the component, in which the component testing device control unit allows the component testing device to operate and apply the simulated operating condition to the component.

In this kind of vehicle testing system, since the actuator simulator virtually operates on a computer in a component test, there is no need to provide an actual actuator which drives the complete vehicle. Therefore, the component can be tested in a simple configuration.

In the component test, the same driving algorithm used in testing the vehicle or the part of the vehicle may be applied to the actuator simulator. Therefore, the same actuator control unit and user interface can be used in testing the vehicle or the part of the vehicle and in testing the components. Also in this respect, the configuration can be simplified, and a user can conduct both tests in a common operation, thus rendering the system more preferable for the user.

In a more specific embodiment, the operating conditions calculating unit identifies the operation features of the actuator based on 1) a value of a command signal, that represents an operating condition, which the actuator control unit applies to the actuator when the actuator drives in the driving algorithm, and 2) a measurement value of the operation of the actuator corresponding to the value of the command signal, and store the operation features of the actuator in the actuator model.

As a specific embodiment of the actuator, an actuator which drives the vehicle on the chassis dynamometer according to the predetermined driving algorithm can be introduced.

Moreover, a vehicle component testing apparatus according to the present invention is used together with a vehicle testing apparatus that includes: an actuator control unit that controls an actuator for operating a vehicle or a part of a vehicle in a predetermined driving algorithm; and an operating conditions calculating unit that calculates operating conditions being applied to a component of the vehicle or a component of the part of the vehicle during the operation of the vehicle or the part of the vehicle by the actuator; the vehicle component testing apparatus comprising: a component testing device that connects to the component; and a component testing device control unit that allows the component testing device to operate and apply to the component the operating conditions calculated by the operating conditions calculating unit.

According to the vehicle testing apparatus and the vehicle component testing apparatus, effects similar to the effects obtained in the vehicle testing system according to the present invention can be obtained.

Moreover, a vehicle testing system according to the present invention includes: an actuator control unit that controls an actuator for operating a vehicle or a part of a vehicle in a predetermined driving algorithm; an operating conditions calculating unit that calculates operating conditions being applied to a component of the vehicle or a component of the part of the vehicle during the operation of the vehicle or the part of the vehicle by the actuator; a vehicle model that stores information on operation features of the components that are identified based on the operating conditions calculated by the operating conditions calculating unit; and a vehicle simulator that calculates, based on the vehicle model, operating conditions to be applied to a replacement component that is meant to be installed.

In this kind of vehicle testing system, the component models of the vehicle are identified. Therefore, when a part of these components is replaced with another different kind of component, it is possible to calculate operating conditions being applied to the replaced component during the operation of the vehicle or the part of the vehicle in a predetermined driving algorithm. Accordingly, for example, when an existing component is replaced with another newly developed component such as a power train, it is possible to obtain, by testing only the new component, a virtual result of a test conducted on a complete vehicle where the new component is installed. This can facilitate bottom-up development.

In short, the present invention may be a vehicle testing system or a method of testing a vehicle, configured to operate a vehicle or a vehicle model and a vehicle component or a vehicle component model in a common (same) driving algorithm.

Advantageous Effects

According to the present invention as configured above, speedier development and correction of malfunctions of vehicles or their parts are made possible and repeated testing can be minimized by testing a complete vehicle and its components under conditions that are as similar as possible.

DESCRIPTION OF EMBODIMENTS

The following describes an embodiment of the present invention with reference to the drawings.

Figure 1:
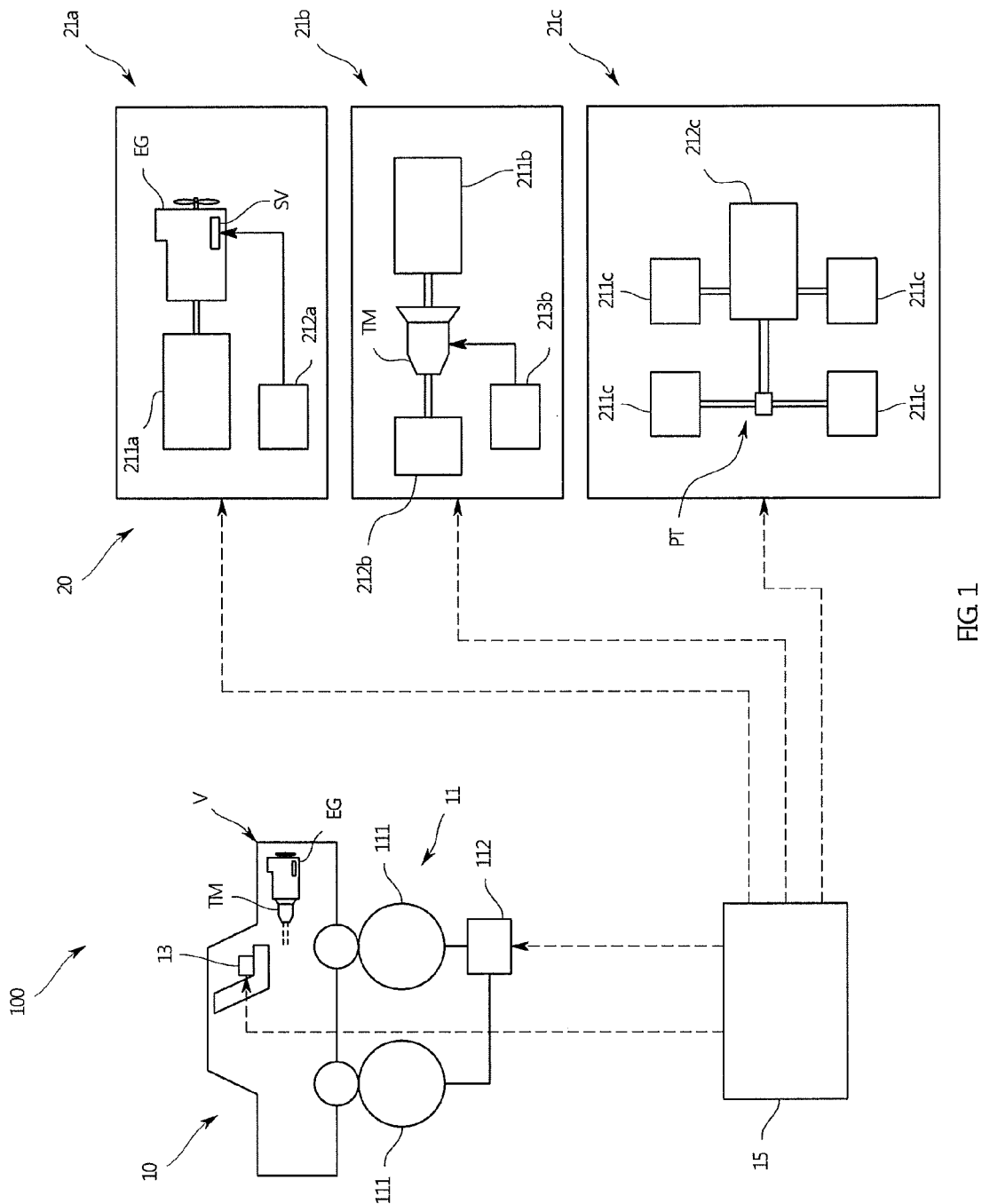
FIG. 1 is a general view schematically illustrating a vehicle testing system in an embodiment.

As FIG. 1 illustrates, a vehicle testing system 100 according to the present embodiment includes a complete vehicle testing apparatus 10 for testing a complete vehicle V and a vehicle component testing apparatus 20 for testing vehicle components.

Figure 2:
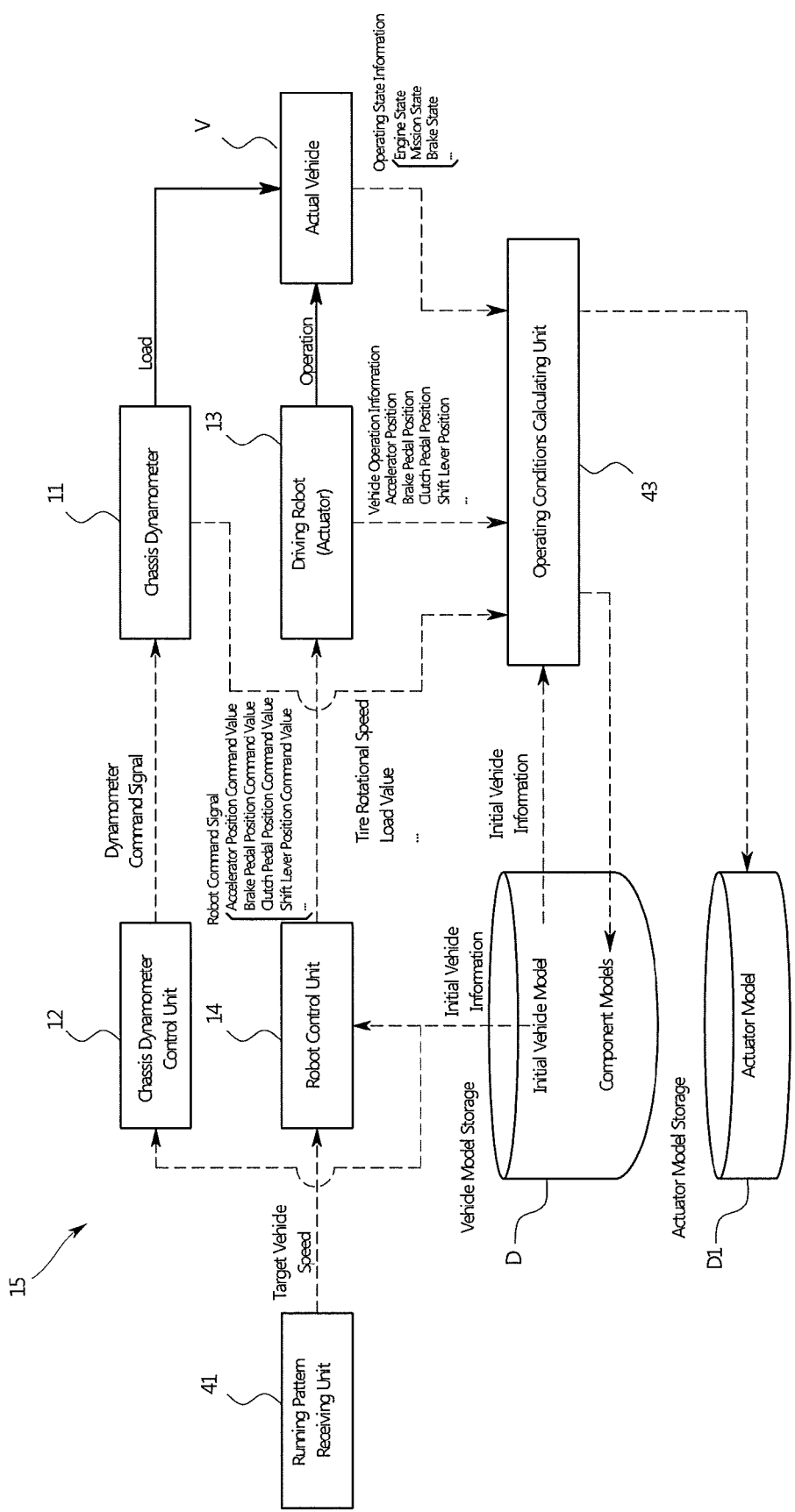
FIG. 2 is a functional block diagram of a control device used in a complete vehicle testing apparatus in the embodiment.

With reference to FIGS. 1 and 2, the following describes the complete vehicle testing apparatus 10.

The complete vehicle testing apparatus 10 includes, for example, a chassis dynamometer 11, a driving robot 13, and a control device 15. The driving robot 13 conducts a mechanical running test for the complete vehicle V on the chassis dynamometer 11. The control device 15 controls the operations of the chassis dynamometer 11 and the driving robot 13. The driving robot 13 drives the complete vehicle V in a predetermined running pattern in accordance with a command from the control device 15, to conduct a simulated performance test on the complete vehicle V.

The following describes more specifically each part of the complete vehicle testing apparatus 10.

The chassis dynamometer 11 includes, for example, rollers 111 onto which the wheels of the complete vehicle V are placed, an alternator/motor 112, and a local computer. The alternator/motor 112 is connected to the rollers 111. The local computer, which is not illustrated in the figure, controls the alternator/motor 112 to control a rotation load on the rollers 111 or other loads.

The driving robot 13 is set to the driver's seat of the complete vehicle V, for example, and includes actuators and a local computer, which is not illustrated in the figure. The actuators respectively operate the accelerator pedal, brake pedal, clutch pedal (only for a MT), shift lever, ignition key, and other components of the complete vehicle V. The local computer controls the operations of these actuators. It should be noted that the local computer may be, for example, a general-purpose computer or a dedicated installed computer.

The control device 15 is computer equipment including a CPU, a memory, a communications port, input components such as a mouse and a touch panel, and a display. The control device 15 commands as described above, the driving robot 13 to drive the complete vehicle V in a predetermined running pattern, and commands the chassis dynamometer 11 to match a load on the complete vehicle V in the running pattern with a load in actual running as much as possible.

More specifically, the control device 15 operates in accordance with a predetermined program stored in the memory thereof, thereby functioning, as FIG. 2 illustrates, as a running pattern receiving unit 41, a robot control unit 14 (corresponding to the actuator control unit in the Claims), and a chassis dynamometer control unit 12. The running pattern receiving unit 41 receives through user input or from a host computer, a specification for a running pattern (including, for example, running modes such as JC08 and EPA75) to be used in a mechanical running test for the complete vehicle V. The robot control unit 14 commands the driving robot 13 to drive the complete vehicle V in the running pattern received by the running pattern receiving unit 41. The chassis dynamometer control unit 12 commands the chassis dynamometer 11 to match as much as possible a load or the like on the complete vehicle V in the running pattern with a load or the like in actual running.

Furthermore, the control device 15 includes a vehicle model storage D in a predetermined region of the memory. The vehicle model storage D stores an initial vehicle model including pieces of initial vehicle information such as the type (truck, passenger car, or the like), weight, transmission type (MT, AT, CVT, or the like), tire diameter, transmission gear ratio, engine features (for example, a relationship between (i) the throttle position and the engine speed and (ii) the output torque), control features of the ECU (for example, a relationship between the accelerator position and the throttle position), control features of the TCU (conditions when the transmission gear ratio is changed and its timing), control features of the BCU (for example, distribution of braking force to each wheel) of the complete vehicle V to be tested. It should be noted that the vehicle model storage D may be included in a temporary memory region.

When the robot control unit 14 is informed of the running pattern, the robot control unit 14 temporarily performs a feed-forward calculation of, for example, an accelerator position, a brake pedal position/pressure, a clutch pedal position/pressure, and a shift lever position for achieving a target vehicle speed indicated by the running pattern, referring to the initial vehicle information. It should be noted that since these values are initially designed values or theoretical values, an actual vehicle speed may deviate from the target vehicle speed. Therefore, to cancel the deviation, for example, the robot control unit 14 compares the above values with actually measured values obtained from the ECU of the complete vehicle V, the sensor of the chassis dynamometer 11, or others, and performs feedback control. The robot control unit 14 thus determines final values, and outputs robot command signals representing the final values to the driving robot 13.

When the predetermined running pattern (i.e., target vehicle speed and/or target gear) is inputted to the robot control unit 14, the robot control unit 14 outputs robot command signals relating to an accelerator position, a brake pedal position/pressure, a clutch pedal position/pressure, a shift lever position, and the like so that the actual vehicle speed is a speed indicated by the running pattern. A relationship between the input and output is a driving algorithm.

Therefore, if, for example, the specifications of the vehicle such as an engine, a vehicle weight, a transmission, and a tire diameter change, the relationship between the input and output also changes. Accordingly, the driving algorithm inevitably changes. The change of the driving algorithm means a change in, for example, a relational expression showing a relationship between input and output as well as changes in parameters set to the driving algorithm (for example, the coefficient of the relational expression showing the relationship between input and output).

The driving robot 13 receives from the robot control unit 14 robot command signals which are command signals relating to an accelerator position, a brake pedal position/pressure, a clutch pedal position/pressure, a shift lever position, and the like determined by this driving algorithm. The driving robot 13 then operates individual actuators to drive the complete vehicle V in the driving algorithm.

When the complete vehicle V is driven by the operation of the driving robot 13 and a vehicle speed generates or when, for example, other condition such as a wind speed or a road gradient is set to the running schedule, the chassis dynamometer control unit 12 calculates a running load to be applied to the complete vehicle V, based on, for example, the vehicle speed, the wind speed, or the road gradient, and outputs a dynamometer command signal for achieving the running load to the chassis dynamometer 11. Upon receiving the dynamometer command signal, the chassis dynamometer 11 controls a current flowing through the alternator/motor 112, thereby controlling rotational resistance or an inertial load on the rollers 111, and applies the running load represented by the dynamometer command signal to the complete vehicle V.

The control device 15 in the present embodiment functions as an operating conditions calculating unit 43 for calculating operating conditions being applied to each component (here, the component includes a single component and a combined part of different kinds of components) during a mechanical running test for the complete vehicle V which the driving robot 13 conducts on the chassis dynamometer 11.

With reference particularly to FIG. 2, the following describes in detail the operating conditions calculating unit 43.

The operating conditions calculating unit 43 obtains from an external sensor, the ECU, the TCU, the BCU, or other units, operation information which the complete vehicle V is informed of during the mechanical running test conducted in the driving algorithm, and vehicle state information which is information on the state of the complete vehicle V in the mechanical running test. Based on the pieces of information, the operating conditions calculating unit 43 calculates, for example, loads, the amounts of operation, and electrical signals which have been actually applied to the components of the complete vehicle V. The operating conditions are, for example, the loads, the amounts of operation, and the electrical signals.

More specifically, the following describes the operation of the operating conditions calculating unit 43, focusing on, for example, an engine EG which is a component of the complete vehicle V.

For instance, a load on the engine EG (or engine output torque), a throttle position, and an engine speed are applied to the engine EG as operating conditions. The operating conditions calculating unit 43 calculates these operating conditions as follows.

The operating conditions calculating unit 43 calculates the load on the engine EG (or the output torque of the engine EG) based on at least a load on the chassis dynamometer 11, a loss due to friction in the drive system from the engine EG through the tires, a loss due to friction between the tires and the rollers 111, a transmission gear ratio (gear ratio) of the transmission TM. The value of the load on the chassis dynamometer 11 among them is obtained from data measured by, for example, a load sensor (not illustrated in the figures) of the chassis dynamometer 11. The loss due to the friction in the drive system from the engine EG through the tires and the loss due to the friction between the tires and the rollers 111 are obtained based on an existing calculation expression which is pre-stored in the vehicle model storage D and where a tire rotation frequency or a transmission gear ratio is a parameter. An AT vehicle or a CVT vehicle obtains the gear ratio from the TCU of the complete vehicle V via a CAN, for example. Meanwhile, an MT vehicle obtains the gear ratio from information on the position of a shift lever operated by the driving robot 13.

The engine speed and throttle position are obtained from, for example, the ECU of the complete vehicle V via the CAN, or an existing sensor (such as a voltage sensor, a vibration sensor, or an encoder).

Thus, the operating conditions calculating unit 43 calculates operating conditions being applied to the engine EG operated in the driving algorithm.

Further, the operating conditions calculating unit 43 creates a virtual model of the engine EG (virtual engine), using the operating conditions as parameters, and stores the virtual model in the vehicle model storage D.

The model of the engine EG is expressed mainly in an expression or a map representing the relationship of three parameters which are a throttle position, an engine speed, and an output torque. This initial value is pre-stored as the initial vehicle information in the vehicle model storage D. Therefore, the operating conditions calculating unit 43 identifies, for example, the coefficient of the expression or the numerical value of the map which matches operating conditions (throttle position, output torque, and engine speed) obtained in an actual mechanical running test with the chassis dynamometer 11. The operating conditions calculating unit 43 then stores the identified expression or map in the vehicle model storage D as an engine model which is one of component models. It should be noted that the operating conditions may also include intake pressure and the temperature of engine oil to create a more sophisticated engine model.

Moreover, operating conditions for the transmission TM are, for example, a load on the input and output axes thereof, a rev, a loss torque, a transmission gear ratio, timing when the speed changes, and a temperature. The operating conditions calculating unit 43 measures and calculates these values in a mechanical running test with the chassis dynamometer 11, and identifies the coefficient of an expression or the numerical value of a map pre-stored in the initial vehicle information which matches the result of the measurement and calculation, to create a transmission model which is one of the component models.

In a similar procedure, the operating conditions calculating unit 43 calculates operating conditions being applied to other components such as a power train, wheels, and a brake during the running of the complete vehicle V, to create component models, and stores the models in the vehicle model storage D. It should be noted that the vehicle components includes not only mechanical components but also electrical components such as the ECU, TCU, and BCU.

In the present embodiment, the operating conditions calculating unit 43 also creates a virtual model of the driving robot 13 (hereinafter also referred to as an actuator model).

As described above, operating conditions applied to the driving robot 13 are the values of robot command signals outputted by the robot control unit 14, i.e., command values relating to an accelerator position, a brake pedal position/pressure, a clutch pedal position/pressure, and a shift lever position. The driving robot 13 receives these robot command signals and operates individual actuators. However, differences occur between the values of the robot command signals and the values of actual operations by the individual actuators due to a response delay, slack, and an error. The operating conditions calculating unit 43 obtains the values of actual operations from the sensor, the ECU, or others, identifies an actuator model for simulating the operation features of the driving robot 13 by measuring the differences, and stores the actuator model in an actuator model storage D1 included in a predetermined region of the memory.

Figure 3:
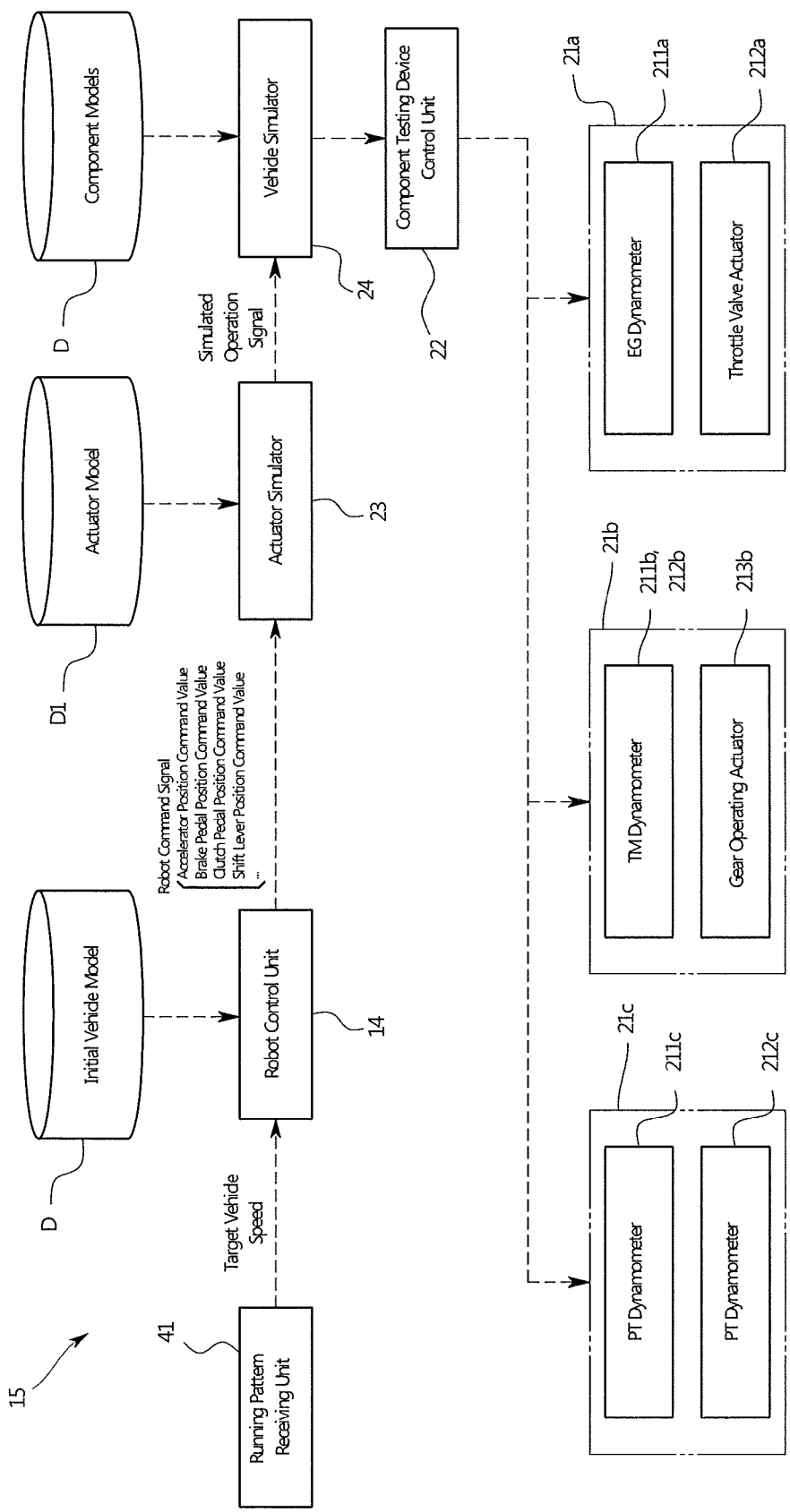
FIG. 3 is a functional block diagram of a control device used in a vehicle component testing apparatus in the embodiment.

With reference to FIGS. 1 and 3, the following describes the vehicle component testing apparatus 20.

The vehicle component testing apparatus 20 includes a component testing device 21, a component testing device control unit 22, an actuator simulator 23, and a vehicle simulator 24. The component testing device 21 is connected to the components of the complete vehicle V. The component testing device control unit 22 controls an operation of the component testing device 21 so that the components can be tested under the same conditions as conditions under which the components installed in the complete vehicle V are tested. The actuator simulator 23 and the vehicle simulator 24 virtually simulate on a computer the operations of the driving robot 13 and the complete vehicle V, respectively.

It should be noted that in the present embodiment, the control device 15 functions as the component testing device control unit 22, the actuator simulator 23, and the vehicle simulator 24. However, other computer equipment rather than the control device 15 may function as these unit and simulators.

Moreover, the vehicle component testing apparatus 20 shares the running pattern receiving unit 41, the robot control unit 14, and the vehicle model storage D with the complete vehicle testing apparatus 10. It should be noted that the component includes not only a single component but also a combined part of different kinds of components.

In the present embodiment, for instance, different kinds of component testing devices 21 are provided to respectively test components such as an engine EG, a transmission TM, and a power train PT.

For instance, an engine testing device 21a for testing an engine includes an EG dynamometer 211a connected to the output axis of the engine EG and a throttle valve actuator 212a for operating a throttle valve SV of the engine EG. While operating the throttle valve SV and operating the engine EG, the engine testing device 21a can apply a simulated load to the output axis of the engine EG, and test, for example, the performance of only the engine EG.

A transmission testing device 21b for testing a transmission includes a TM dynamometer 211b and a TM dynamometer 212b respectively connected to the input axis and output axis of the transmission TM, and a gear operating actuator 213b for operating the gear change lever of the transmission TM. The transmission testing device 21b can apply simulated loads to the input and output axes of the transmission TM while changing a gear ratio, and test, for example, the performance of only the transmission TM.

A power train testing device 21c for testing a power train includes a PT dynamometer 212c connected to the input axis (the axis connected to the transmission TM) of the power train PT, and PT dynamometers 211c connected to the output axis (the axis connected to the wheels) of the power train PT. The power train testing device 21c can apply simulated loads to the input and output axes of the power train PT, and test, for example, the performance of only the power train PT.

The actuator simulator 23 receives from the robot control unit 14 an input signal similar to an input signal received by the driving robot 13, i.e., a robot command signal, and generates, by referring to the actuator model, and outputs a simulated operation signal representing an operation of the driving robot 13 with the value of an electrical signal. For instance, upon receiving a command signal relating to an accelerator position, the actuator simulator 23 simulates a response delay, an error, or others in the driving robot 13, and outputs a simulated operation signal having a value corresponding to the amount of an operation by an accelerator actuator. The simulated operation signal may be sent in communications within a software.

Upon receiving the simulated operation signal from the actuator simulator 23, the vehicle simulator refers to the component models and simulates an operation of the complete vehicle V corresponding to the simulated operation signal, and calculates operating conditions to be respectively applied to vehicle components connected to each other.

The component testing device control unit 22 receives operating conditions to be applied to a component to be tested, and outputs a control signal to a corresponding component testing device 21 so that operating conditions similar to the received operating conditions are applied to the component.

The following describes the operations of the vehicle component testing apparatus 20.

For instance, when the user inputs a running pattern in a similar manner to a mechanical running test for the complete vehicle V with the chassis dynamometer 11, the robot control unit 14 outputs a robot command signal for achieving the running pattern. It should be noted that the robot control unit 14 in the present embodiment generates, in a similar manner to the test with the chassis dynamometer 11, the robot command signal in consideration of a feed-back control setting method as well as a feed-forward setting method based on the initial vehicle information. However, the feed-back control setting method is based on operation information on the vehicle simulator 24 instead of information from the complete vehicle V.

Upon receiving the robot command signal, the actuator simulator 23 refers to an actuator model and outputs a simulated operation signal as described above.

The vehicle simulator 24 simulates an operation of the complete vehicle V corresponding to the simulated operation signal, and calculates operating conditions to be applied to each of vehicle components.

The component testing device control unit 22 receives the operating conditions, and outputs a control signal to a corresponding component testing device 21 so that operating conditions similar to the received operating conditions are applied to the component.

For instance, the component testing device control unit 22 sends command signals to the engine testing device 21a. More specifically, the component testing device control unit 22 sends to the EG dynamometer 211a, a command signal representing a load value determined in the operating conditions. Meanwhile, the component testing device control unit 22 sends to the throttle valve actuator 212a, a command signal representing a throttle position determined in the operating conditions.

Moreover, the component testing device control unit 22 sends command signals to the transmission testing device 21b. More specifically, to apply to the transmission TM a load and a rev determined in the operating conditions, the component testing device control unit 22 sends command signals representing the value of the load and the rev to the TM dynamometer 211b and the TM dynamometer 212b. Meanwhile, the component testing device control unit 22 sends to the gear operating actuator 213b a command signal representing the position of the gear change lever and the gear change timing which are determined in the operating conditions.

Moreover, the component testing device control unit 22 sends command signals to the power train testing device 21c. More specifically, to apply to the power train PT, a load and a rev determined in the operating conditions, the component testing device control unit 22 sends command signals representing the value of the load and the rev to the PT dynamometers 211c and PT dynamometer 212c.

According to the vehicle testing system 100 in the present embodiment configured as above, a vehicle model (component models) and an actuator model are created based on operating conditions obtained through actual measurement in a mechanical running test for the complete vehicle V. In addition, in a component test, operating conditions such as a load on a component are determined based on virtual operations which the actuator simulator 23 and the vehicle simulator 24 perform referring to these models. This makes the operating conditions in the component test highly similar to operating conditions in a complete vehicle test. If the running pattern is same as the complete vehicle test, the effects are especially significant.

This can test vehicle components under conditions equivalent to conditions under which the complete vehicle V is tested if the driving algorithm is same in the both tests. This can facilitate improvement in development speed of the vehicle components and speedier resolution of malfunctions of the vehicle components.

Further, the operator provides data in the same format as the format of data inputted in the complete vehicle test (in the present embodiment, for example, a running pattern in the same format). By so doing, a similar driving algorithm is achieved which relates to, for example, a simulated operation of the driving robot 13 performed by the robot control unit 14 and a simulated load on a component generated by the dynamometer controlling unit 12. Accordingly, the same user operation such as data input can be performed in the both tests. This can provide a system having an excellent operability.

It should be noted that the present invention is not limited to the above embodiment.

For instance, the actuator model and the actuator simulator are not necessarily used. Alternatively, the actuator may be used. For instance, in a test for only a transmission, an originally-equipped mechanism of the vehicle may be used which functions as a shift lever to a gear shift actuator, and the shift lever operating actuator of a driving robot may operate the shift lever.

Moreover, each function of the control device may be physically performed by separate computers, for example. In this case, the control device may communicate with the computers by sending operating conditions data representing operating conditions via communications or transferring the operating conditions data via a recording medium such as a USB memory.

This can test the complete vehicle V and its components under conditions that are as similar as possible even if the complete vehicle V and its components are tested in different places.

Moreover, the complete vehicle V is not necessarily the basis of a mechanical running test. Alternatively, a part of the vehicle such as a combined part of an engine and a transmission may be the basis of the mechanical running test. In this case, the engine and transmission, which are the components of the combined part, or the constituent components of the engine and transmission are target components to be tested.

Other components to be tested are, for example, a brake, an ECU, a TCU, and a BCU. Not only a single component but also a combined part of components such as all the components other than the engine may be target components to be tested.

Moreover, according to the present invention, the component models of the vehicle are identified. Therefore, when a part of components is replaced with another kind of component, it is possible to calculate operating conditions being applied to the replacement component during operation in a predetermined driving algorithm. Therefore, for instance, when a conventional power train is replaced with a newly developed power train without changing other components, it is possible to obtain, by testing only the newly developed power train, a virtual result of a test conducted on a complete vehicle where the newly developed power train is installed. More preferably, a similar driving algorithm may be achieved by the operator only providing data in the same format to the control device, in a similar manner to the embodiment.

The driving robot used in the complete vehicle testing apparatus is not necessarily used. For instance, if actuators for operating the throttle valve and the brake are provided in the vehicle, the control device may output a signal to the ECU or TCU of the vehicle to operate the actuators.

The initial vehicle model, the actuator model, the component model, running pattern and more may be managed by a server system. By this configuration, above mentioned data can be commonly used for several kinds of testing apparatuses (different configured testing apparatuses) easily.

The present invention is not limited to the embodiment. Without departing from the scope of the present invention, the embodiment can be variously modified by, for example, combining the constituent parts of the embodiment.

REFERENCE SIGNS LIST 100 vehicle testing system
10 complete vehicle testing apparatus
11 chassis dynamometer
12 chassis dynamometer control unit
13 driving robot
14 robot control unit
15 control device
20 vehicle component testing apparatus
21 (21a, 21b, and 21c) component testing device
22 component testing device control unit
23 actuator simulator
24 vehicle simulator
41 running pattern receiving unit
43 operating conditions calculating unit

What is claimed is:

1. A vehicle testing system comprising:
an actuator control unit configured to control an actuator that operates at least a portion of an actual vehicle according to a predetermined driving algorithm during a first time period;
an operating conditions calculating unit configured to, during the first time period,
calculate operating conditions being applied to an actual component of the at least a portion of the actual vehicle by the actuator control unit,
create a component model that contains information on operation features of the actual component that are identified based on the calculated operating conditions, and
store the component model in a predetermined region of a memory storage member;
a component testing device that mechanically connects to the actual component during a second time period having a starting point that is later than a starting point of the first time period; and
a component testing device control unit configured to
refer to the component model stored in the predetermined region of the memory storage member, and
command the component testing device to operate and apply the calculated operating conditions to the actual component during the second time period,
wherein the vehicle testing system is configured to operate the at least a portion of the actual vehicle during the first time period and the actual component in a common driving algorithm during the second time period.

2. The vehicle testing system according to claim 1, further comprising:
an actuator model, storing information on operation features of the actuator;
an actuator simulator configured to receive a command signal outputted by the actuator control unit, to apply the command signal to the actuator model, and to output a simulated operation signal of the actual vehicle or the actual component corresponding to the operation of the actuator; and
a vehicle simulator configured to receive the simulated operation signal outputted by the actuator simulator, to apply the simulated operation signal of the actuator simulator to the component model, and to output a simulated operating condition to be applied to the actual component,
wherein the component testing device control unit is configured to command the component testing device to operate and apply the simulated operating condition to the actual component.

3. The vehicle testing system according to claim 2,
wherein the operating conditions calculating unit is configured to
identify the operation features of the actuator based on
1) a value of a command signal, that represents an operating condition, which the actuator control unit applies to the actuator when the actuator drives according to the predetermined driving algorithm, and
2) a measurement value of the operation of the actuator corresponding to the value of the command signal, and
store the operation features of the actuator in the actuator model.

4. The vehicle testing system according to claim 1,
wherein the actuator is configured to drive the actual vehicle on a chassis dynamometer according to the predetermined driving algorithm.

5. A vehicle component testing apparatus used together with a vehicle testing apparatus that comprises:
an actuator control unit configured to control an actuator that operates at least a portion of an actual vehicle according to a predetermined driving algorithm during a first time period; and
an operating conditions calculating unit configured to, during the first time period, calculate operating conditions being applied to an actual component of the at least a portion of the actual vehicle by the actuator control unit, create a component model that contains information on operation features of the actual component that are identified based on the calculated operating conditions, and store the component model in a predetermined region of a memory storage member;

the vehicle component testing apparatus comprising:

a component testing device that mechanically connects to the actual component during a second time period having a starting point that is later than a starting point of the first time period; and a component testing device control unit configured to refer to the component model stored in the predetermined region of the memory storage member, and command the component testing device to operate and apply the calculated operating conditions to the actual component during the second time period, wherein the vehicle component testing apparatus is configured to operate the at least a portion of the actual vehicle during the first time period and the actual component in a common driving algorithm during the second time period.

6. A vehicle testing system comprising:

an actuator control unit configured to control an actuator that operates at least a portion of an actual vehicle according to a predetermined driving algorithm during a first time period;

an operating conditions calculating unit configured to, during the first time period, calculate operating conditions being applied to an actual component of the at least a portion of the actual vehicle by the actuator control unit, create a vehicle model that contains information on operation features of actual components that are identified based on the calculated operating conditions, and store the vehicle model in a predetermined region of a memory storage member; and a vehicle simulator configured to calculate, based on the vehicle model stored in the predetermined region of the memory storage member, operating conditions to be applied during a second time period having a starting point that is later than a starting point of the first time period to a replacement component that is meant to be installed, wherein the vehicle testing system is configured to operate the at least a portion of the actual vehicle during the first time period and the actual component in a common driving algorithm during the second time period.

7. A method of testing an actual vehicle, comprising:

during a first time period, controlling an actuator that operates at least a portion of the actual vehicle according to a predetermined driving algorithm, calculating operating conditions being applied to an actual component of the at least a portion of the actual vehicle by the actuator, creating a component model that contains information on operation features of the actual component that are identified based on the calculated operating conditions, and storing the component model in a predetermined region of a memory storage member; and during a second time period having a starting point that is later than a starting point of the first time period, controlling a component testing device that mechanically connects to the actual component to test the actual component by referring to the component model stored in the predetermined region of the memory storage member and applying the calculated operating conditions, wherein the method of testing an actual vehicle is configured to operate the at least a portion of the actual vehicle during the first time period and the actual component in a common driving algorithm during the second time period.

8. A method of testing an actual vehicle, comprising:

controlling an actuator that operates at least a portion of the actual vehicle according to a predetermined driving algorithm during a first time period;

calculating operating conditions being applied to an actual component of the at least a portion of the actual vehicle by the actuator during the first time period;

storing in a vehicle model, in a predetermined region of a memory storage member, information on operation features of actual components that are identified based on the calculated operating conditions during the first time period; and calculating based on the vehicle model, operating conditions to be applied during a second time period having a starting point that is later than a starting point of the first time period to a replacement component, wherein the method of testing an actual vehicle is configured to operate the at least a portion of the actual vehicle during the first time period and the actual component in a common driving algorithm during the second time period.

* * * * *